(12) United States Patent
Kallianteris et al.

(10) Patent No.: US 11,131,248 B2
(45) Date of Patent: Sep. 28, 2021

(54) PLANETARY GEAR, SPLINED SLEEVE, GAS TURBINE ENGINE WITH A PLANETARY GEAR AND METHOD FOR MANUFACTURING A PLANETARY GEAR

(71) Applicant: Rolls-Royce Deutschland Ltd & Co KG, Blankenfelde-Mahlow (DE)

(72) Inventors: Christos Kallianteris, Berlin (DE); Jan Schwarze, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 421 days.

(21) Appl. No.: 16/357,484

(22) Filed: Mar. 19, 2019

(65) Prior Publication Data

US 2020/0025102 A1 Jan. 23, 2020

(30) Foreign Application Priority Data

Mar. 20, 2018 (DE) ..................... 10 2018 106 564.7

(51) Int. Cl.
*F02C 7/36* (2006.01)
*F16H 57/08* (2006.01)
*F16H 57/02* (2012.01)

(52) U.S. Cl.
CPC ............... *F02C 7/36* (2013.01); *F16H 57/08* (2013.01); *F16H 57/082* (2013.01); *F16H 2057/02039* (2013.01)

(58) Field of Classification Search
CPC ................................. F16H 57/082; F02C 7/36
See application file for complete search history.

(56) References Cited

U.S. PATENT DOCUMENTS 2,591,743 A * 4/1952 Thompson .......... F16H 57/0479
475/346
4,700,583 A 10/1987 Hicks
(Continued)

FOREIGN PATENT DOCUMENTS

DE 2049580 A1 9/1971
DE 102005007525 B3 8/2006
(Continued)

OTHER PUBLICATIONS

Kallianteris—U.S. Appl. No. 16/543,057, filed Aug. 16, 2019.
(Continued)

*Primary Examiner* — Woody A Lee, Jr.
(74) *Attorney, Agent, or Firm* — Shuttleworth & Ingersoll PLC; Timothy Klima

(57) ABSTRACT

A planetary gearbox, a splined sleeve, a gas turbine engine with a planetary gearbox and a method for producing a torque-proof connection between a planetary carrier and a support element. The splined sleeve is formed with an outer substantially cylindrical shell surface area and an inner conical shell surface area, and is inserted between the planetary carrier and the support element for creating the torque-proof connection. The diameter of the inner conical shell surface area decreases in the axial direction, starting from an end of the splined sleeve in the direction of a second end of the splined sleeve. The outer cylindrical shell surface area is formed in a stepped manner. The outer cylindrical shell surface area comprises a first cylindrical section and a second cylindrical section which has a diameter larger than the diameter of the first cylindrical section. Between the sections, a conical area is provided.

15 Claims, 5 Drawing Sheets

(56) References Cited

U.S. PATENT DOCUMENTS

| | | | |
|---|---|---|---|
| 5,391,125 A * | 2/1995 | Turra | F16H 1/2836 |
| | | | 475/331 |
| 5,466,198 A * | 11/1995 | McKibbin | F02C 7/36 |
| | | | 475/346 |
| 5,863,272 A | 1/1999 | Anderson | |
| 8,205,432 B2 * | 6/2012 | Sheridan | F02C 7/36 |
| | | | 60/226.3 |
| 2010/0035719 A1 * | 2/2010 | Wang | F16H 57/08 |
| | | | 475/331 |
| 2010/0077881 A1 | 4/2010 | Hicks | |
| 2013/0023378 A1 * | 1/2013 | McCune | F16H 1/28 |
| | | | 475/344 |
| 2013/0184114 A1 * | 7/2013 | Norem | F16H 57/082 |
| | | | 475/159 |
| 2015/0105212 A1 | 4/2015 | Graham et al. | |
| 2017/0227115 A1 | 8/2017 | Smook et al. | |
| 2018/0031116 A1 | 2/2018 | Johnson | |
| 2018/0100573 A1 * | 4/2018 | Madge | F16H 57/0479 |

FOREIGN PATENT DOCUMENTS

| | | |
|---|---|---|
| DE | 102010017463 A1 | 12/2011 |
| DE | 102012206257 A1 | 10/2013 |
| DE | 102014214295 A1 | 1/2016 |
| DE | 102016208440 A1 | 11/2017 |
| EP | 3306140 A1 | 4/2018 |
| GB | 2409508 A | 6/2005 |
| GB | 1617033.4 | 10/2016 |

OTHER PUBLICATIONS

German Search Report dated Feb. 7, 2019 for counterpart German Patent Application No. 10 2018 106 564.7.
German Search Report dated Jul. 3, 2019 from related German App #102018122535.0.

* cited by examiner

PLANETARY GEAR, SPLINED SLEEVE, GAS TURBINE ENGINE WITH A PLANETARY GEAR AND METHOD FOR MANUFACTURING A PLANETARY GEAR

This application claims priority to German Patent Application DE102018106564.7 filed Mar. 20, 2018, the entirety of which is incorporated by reference herein.

The present disclosure relates to a planetary gearbox with a planetary carrier and a support element that is fixedly connected to the same. Further, the present disclosure relates to a splined sleeve with a substantially cylindrical shell surface area. In addition, the present disclosure relates to a gas turbine engine with a planetary gearbox as well as to a method for producing a torque-proof connection between a planetary carrier and a support element of the planetary gearbox.

Known from practice are gas turbine engines in which a fan is connected to a low-pressure turbine by means of a planetary gearbox. The planetary gearbox is embodied with a stationary ring gear and a rotating planetary carrier. Here, the planetary carrier is formed in multiple pieces. The planetary gears are arranged in the axial direction of the gas turbine engine between two planetary carrier areas in a rotatable manner on support appliances that are connected to the same. The support appliances respectively comprise a bolt being operatively connected to the planetary carrier areas in a torque-proof manner by means of press fits. Provided between the planetary gears and the bolts are slide or roller bearings by means of which the rotational decoupling is realized.

The press fits are usually realized in a cost-effective manner as rotating connections and/or as shrink connections. Here, it is known that rotating connections are joined by cooling the inner portion, and shrink connections are joined by heating the outer portion. If over-sizes are present, both methods are combined.

In use of the gas turbine engine, strong centrifugal forces act on the planetary gears of the planetary gearbox as a result of the high rotational speeds of the planetary carrier. Depending on the respectively selected embodiment of the planetary gearbox, not only centrifugal forces are introduced, but also the loads of the torque that is respectively to be transmitted during use. The forces respectively resulting therefrom are introduced through the press fits into the planetary carrier areas.

What is problematic here, however, is the fact that the holding forces resulting from the press fits provided between the bolts and the planetary carrier areas are overcome if an admissible load limit is exceeded, and undesired relative movements occur between the bolts and the planetary carrier areas. Such relative movements result in undesired wear in the area of the bolts and the planetary carrier areas, which over time have a negative impact on the functionality of the planetary gearbox, and thus reduce the service life of the planetary gearbox.

What is known from the unpublished GB 1617033.4 of the applicant is a solution by means of which such relative movements in the area between the bearing bolts of the planetary gears and the planetary carrier, by which the service life of a planetary gearbox is reduced, are to be avoided. For this purpose, it is proposed to provide respectively at least one wedge in the connection areas between the bolts and the planetary carrier areas to obtain holding forces of the press fits between the bolts and the planetary carrier areas that are as high as possible.

The wedges are inserted between the bolts and the planetary carrier areas by using liquid nitrogen and injecting highly pressurized oil, which is associated with a high mounting effort, however. Through the wedges, pre-stresses are created in the bolts in the planetary carrier areas that surround the bolt in order to provide the holding forces that respectively counteract the relative movements of the bolts with respect to the planetary carrier areas.

The loads that act on the planetary gears during use partially overlap with the introduced pre-stresses. These overlappings in turn support a release of the press fits between the bolts and the planetary carrier areas, since they cause a reduction of the holding forces that are acting in the area of the press fits.

To be able to avoid any release of the press fits during operation in a reliable manner, the stiffness of the planetary carrier areas has to be designed to be correspondingly high, which however increases the weight of the planetary gearbox in a disadvantageous manner.

Thus, the present disclosure is based on the objective of providing a planetary gearbox which is characterized by a low component weight and a long service life, and which is also easily mountable. What is further to be provided is a gas turbine engine with such a planetary gearbox as well as a constructionally simple splined sleeve that can be produced in a cost-effective manner. In addition, an easily performable method for producing a torque-proof connection between a planetary carrier and a support element of a planetary gearbox is to be provided.

According to a first aspect, a planetary gearbox with a planetary carrier and with a support element that is fixedly connected therewith is provided. At least one planetary gear can be mounted on the support element in a rotatable manner. The support element radially engages in a bore of the planetary carrier. A splined sleeve is provided radially between the planetary carrier and the support element. With a substantially outer cylindrical shell surface area, the splined sleeve is in operative connection with a cylindrical surface of the bore of the planetary carrier, and with an inner conical shell surface area, it is in operative connection with an outer conical shell surface area of the support element. The outer cylindrical shell surface area of the splined sleeve is formed in a stepped manner and comprises a first section and a second section between which a conical section is provided. The outer diameter of the first section is smaller than the outer diameter of the second section. The outer diameter of the first section and the inner diameter of the surface of the bore of the planetary carrier are adjusted to each other in such a manner that a clearance fit or a transition fit is present in the overlapping area between the planetary carrier and the first section.

In this manner, it is achieved that the splined sleeve can be pre-assembled with low joining forces inside the bore of the planetary carrier and can be inserted with the first section into the planetary carrier, and can also be arranged in the planetary carrier in an adjusted manner for the further joining process. In the course of the further joining processes, during which the splined sleeve is inserted between the planetary carrier and the support element also with its second section, a tilt-proof insertion of the splined sleeve with respect to the planetary carrier and the support element is provided.

In addition, the inner diameter of the surface of the bore of the planetary carrier and the outer diameter of the second section are adjusted to each other in such a manner that an interference fit is present in the overlapping area between the planetary carrier and the second section. In this manner, the necessary bearing holding forces can be provided in the overlapping area between the planetary carrier and the support area with low joining forces and without using liquid nitrogen, while at the same time requiring only little mounting effort.

Here, the course of the inner diameter of the inner conical shell surface area and the course of the outer conical shell surface area of the support element can be adjusted to each other in such a manner that an interference fit is present in the completely fitted operational state of the splined sleeve in the overlapping area between the inner conical shell surface area and the outer conical shell surface area of the support element. In this way, the holding forces that are necessary for a rotation-proof connection between the planetary carrier and the support element can again be provided with little effort.

Further, it can be provided that the axial length of the first section of the outer cylindrical shell surface area of the splined sleeve corresponds to approximately a tenth of the total axial length of the overlapping area between the planetary carrier and the splined sleeve. This embodiment offers the possibility of pre-mounting the splined sleeve in the planetary carrier in a tilt-proof manner and so as to be adjusted to the necessary degree, again with low constructional effort.

The axial length of the first section of the outer cylindrical shell surface area of the splined sleeve can be at least 5 mm.

For example, the outer diameter of the first section of the outer cylindrical shell surface area of the splined sleeve can deviate by a defined diameter value from the inner diameter of the surface of the planetary carrier. Here, the defined diameter value can have values of between −0.05 mm and +0.05 mm.

The outer diameter of the second section of the outer cylindrical shell surface area of the splined sleeve can deviate by a defined diameter value from the inner diameter of the surface of the planetary carrier. The defined diameter value can have values of higher than zero and lower than or equal to +0.4 mm.

The diameter of the inner conical shell surface area can decrease in the axial direction, starting from the first section of the outer cylindrical shell surface area in the direction of the second section of the outer cylindrical shell surface area.

The conical section of the outer cylindrical shell surface area can form an end stop during the insertion of the first section of the splined sleeve into the planetary carrier.

The support element can be formed with an end stop at which the splined sleeve abuts with an end face that is associated with the first section when, with its second section, the splined sleeve is completely overlapping with the planetary carrier.

According to a further aspect, what is provided is a splined sleeve with an outer substantially cylindrical shell surface area and with an inner conical shell surface area. The diameter of the inner conical shell surface area decreases in the axial direction, starting from a first end of the splined sleeve in the direction of a second end of the splined sleeve. The outer cylindrical shell surface area is formed in a stepped manner. In addition, the outer cylindrical shell surface area comprises a first cylindrical section and a second cylindrical section which has a diameter that is larger than the diameter of the first cylindrical section. Moreover, a conical area is provided between the sections.

What is proposed according to a further aspect is a gas turbine engine for an aircraft, comprising the following:

an engine core that comprises a turbine, a compressor, and a core shaft that connects the turbine to the compressor;

a fan that is positioned upstream of the engine core, wherein the fan comprises multiple fan blades; and a gearbox that receives an input from the core shaft and outputs drive for the fan for driving the fan with a lower rotational speed than the core shaft, wherein the gearbox is embodied as a planetary gearbox as described in more detail above.

As is explained elsewhere herein, the present disclosure may relate to a gas turbine engine. Such a gas turbine engine can comprise an engine core which comprises a turbine, a combustion space, a compressor, and core shaft that connects the turbine to the compressor. Such a gas turbine engine can comprise a fan (with fan blades) that is positioned upstream of the engine core.

Arrangements of the present disclosure may be particularly, although not exclusively, beneficial for fans that are driven by means of a gearbox. Correspondingly, the gas turbine engine may comprise a gearbox that receives an input from the core shaft and outputs drive for the fan for driving the fan with a lower rotational speed than the core shaft. The input to the gearbox may be directly from the core shaft, or indirectly from the core shaft, for example by means of a spur shaft and/or gear. The core shaft may be rigidly connected to the turbine and the compressor, such that the turbine and the compressor rotate at the same rotational speed (with the fan rotating at a lower rotational speed). Here, the gearbox can be embodied as a planetary gearbox as it is described in more detail above.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example by means of a generally annular duct) a flow from the first compressor.

The gearbox may be embodied to be driven by the core shaft that is configured to rotate (for example in use) at the lowest rotational speed (for example the first core shaft in the example above). For example, the gearbox may be embodied to be driven only by the core shaft that is configured to rotate (for example in use) at the lowest rotational speed (for example only by the first core shaft, and not the second core shaft, in the example above). Alternatively, the gearbox may be embodied to be driven by one or multiple shafts, for example the first and/or second shaft in the above example.

In a gas turbine engine as described and/or claimed herein, a combustion space may be provided axially downstream of the fan and the compressor (or the compressors). For example, the combustion space may be located directly downstream of the second compressor (for example at the exit thereof), if a second compressor is provided. By way of further example, the flow at the exit to the combustor may be provided to the inlet of the second turbine, if a second turbine is provided. The combustion space may be provided upstream of the turbine(s).

The or each compressor (for example the first compressor and the second compressor according to the above description) may comprise any number of stages, for example multiple stages. Each stage may comprise a row of rotor blades and a row of stator vanes, which may be variable stator vanes (i.e. in that their angle of incidence may be variable). The row of rotor blades and the row of stator vanes may be axially offset with respect to each other.

The or each turbine (for example the first turbine and second turbine according to the above description) may comprise any number of stages, for example multiple stages. Each stage may comprise a row of rotor blades and a row of stator vanes. The row of rotor blades and the row of stator vanes may be axially offset with respect to each other.

Each fan blade may be defined with a radial span width extending from a root (or hub) at a radially inner gas-washed location, or from a 0% span position to a tip with a 100% span width. Here, the ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in a closed range bounded by any two values in the previous sentence (i.e., the values may represent upper or lower bounds). These ratios may commonly be referred to as the hub-to-tip ratio. The radius at the hub and the radius at the tip may both be measured at the leading (or the axially forwardmost) edge of the blade. The hub-to-tip ratio refers, of course, to the gas-washed portion of the fan blade, i.e. the portion that is located radially outside any platform.

The radius of the fan may be measured between the engine centerline and the tip of a fan blade at its leading edge. The fan diameter (which may simply be twice the radius of the fan) may be greater than (or on the order of) any of: 250 cm (about 100 inches), 260 cm, 270 cm (about 105 inches), 280 cm (about 110 inches), 290 cm (about 115 inches), 300 cm (about 120 inches), 310 cm, 320 cm (about 125 inches), 330 cm (about 130 inches), 340 cm (about 135 inches), 350 cm, 360 cm (about 140 inches), 370 cm (about 145 inches), 380 (about 150 inches) cm or 390 cm (about 155 inches). The fan diameter may be in a closed range bounded by any two of the values in the previous sentence (i.e. the values may represent upper or lower bounds).

The rotational speed of the fan may vary during use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range from 1700 rpm to 2500 rpm, for example in the range of between 1800 rpm to 2300 rpm, for example in the range of between 1900 rpm to 2100 rpm. Purely by way of further non-limitative example, the rotational speed of the fan at cruise conditions for an engine having a fan diameter in the range of between 320 cm to 380 cm may be in the range of between 1200 rpm to 2000 rpm, for example in the range of between 1300 rpm to 1800 rpm, for example in the range of between 1400 rpm to 1600 rpm.

In use of the gas turbine engine, the fan (with the associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as the fan tip radius at the leading edge multiplied by the angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (with all units in this paragraph being $Jkg^{-1}K^{-1}/(ms^{-1})^2$). The fan tip loading may be in a closed range bounded by any two of the values in the previous sentence (i.e. the values may represent upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements, the bypass ratio may be greater than (or on the order of): 10, 10.5, 11, 11.5, 12, 12.5, 13, 13.5, 14, 14.5, 15, 15.5, 16, 16.5, or 17. The bypass ratio may be in a closed range bounded by any two of the values in the previous sentence (i.e. the values may represent upper or lower bounds). The bypass duct may be substantially annular. The bypass duct may be radially outside the core engine. The radially outer surface of the bypass duct may be defined by a nacelle and/or a fan housing.

The overall pressure ratio of a gas turbine engine as described and/or claimed herein may be defined as the ratio of the stagnation pressure upstream of the fan to the stagnation pressure at the exit of the highest-pressure compressor (before entry into the combustion space). By way of non-limitative example, the overall pressure ratio of a gas turbine engine as described and/or claimed herein at cruising speed may be greater than (or on the order of): 35, 40, 45, 50, 55, 60, 65, 70, 75. The overall pressure ratio may be in a closed range bounded by any two of the values in the previous sentence (i.e. the values may represent upper or lower bounds).

Specific thrust of a gas turbine engine may be defined as the net thrust of the gas turbine engine divided by the total mass flow through the engine. At cruise conditions, the specific thrust of an engine as described and/or claimed herein may be less than (or on the order of): 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in a closed range bounded by any two of the values in the previous sentence (i.e. the values may represent upper or lower bounds). Such gas turbine engines may be particularly efficient as compared to conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of): 160 kN, 170 kN, 180 kN, 190 kN, 200 kN, 250 kN, 300 kN, 350 kN, 400 kN, 450 kN, 500 kN, or 550 kN. The maximum thrust may be in a closed range bounded by any two of the values in the previous sentence (i.e. the values may represent upper or lower bounds). The thrust referred to above may be the maximum net thrust at standard atmospheric conditions at sea level plus 15 deg C. (ambient pressure 101.3 kPa, temperature 30 deg C.), with the engine being static.

In use, the temperature of the flow at the entry to the high-pressure turbine may be particularly high. This temperature, which may be referred to as TET, may be measured at the exit to the combustion space, for example immediately upstream of the first turbine vane, which itself may be referred to as a nozzle guide vane. At cruising speed, the TET may be at least (or on the order of): 1400 K, 1450 K, 1500 K, 1550 K, 1600 K or 1650 K. The TET at cruising speed may be in a closed range bounded by any two of the values in the previous sentence (i.e. the values may represent upper or lower bounds). The maximum TET in use of the engine may be, for example, at least (or on the order of): 1700 K, 1750 K, 1800 K, 1850 K, 1900 K, 1950 K or 2000 K. The maximum TET may be in a closed range bounded by any two of the values in the previous sentence (i.e. the values may represent upper or lower bounds). The maximum TET may occur, for example, at a high thrust condition, for example at a maximum take-off (MTO) condition.

A fan blade and/or aerofoil portion of a fan blade as described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fiber. By way of further example at least a part of the fan blade and/or aerofoil may be manufactured at least in part from a metal, such as a titanium based metal or an aluminum based material (such as an aluminum-lithium alloy) or a steel based material. The fan blade may comprise at least two regions that are manufactured by using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fiber or aluminum based body (such as an aluminum lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture device which may engage a corresponding slot in the hub (or disc). Purely by way of example, such a fixture device may be present in the form of a dovetail that may be inserted into a corresponding slot in the hub/disc and/or may engage with the same in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow for the exit area of the bypass duct to be varied during operation. The general principles of the present disclosure may apply to engines with or without a VAN.

The fan of a gas turbine engine as described and/or claimed herein may have any desired number of fan blades, for example 16, 18, 20, or 22 fan blades.

As used herein, cruise conditions may refer to the cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of descent.

Purely by way of example, the forward speed at cruise condition may be any point in the range from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85, or in the range from 0.8 to 0.85. Any single speed within these ranges may be the cruise condition. For some aircrafts, the cruise conditions may be outside these ranges, for example below Mach 0.7 or above Mach 0.9.

Purely by way of example, the cruise conditions may correspond to standard atmospheric conditions at an altitude that is in the range from 10000 m to 15000 m, for example in the range from 10000 m to 12000 m, for example in the range from 10400 m to 11600 m (around 38000 ft), for example in the range from 10500 m to 11500 m, for example in the range from 10600 m to 11400 m, for example in the range from 10700 m (around 35000 ft) to 11300 m, for example in the range from 10800 m to 11200 m, for example in the range from 10900 m to 11100 m, for example on the order of 11000 m. The cruise conditions may correspond to standard atmospheric conditions at any given altitude in these ranges.

Purely by way of example, the cruise conditions may correspond to the following: a forward Mach number of 0.8; a pressure of 23000 Pa; and a temperature of −55 deg C.

As used anywhere herein, "cruise" or "cruise conditions" may refer to the aerodynamic design point. Such an aerodynamic design point (or ADP) may correspond to the conditions (comprising, for example, one or more of the Mach Number, environmental conditions and thrust requirement) in which the fan is designed to operate. This may mean, for example, the conditions at which the fan (or the gas turbine engine) is designed to have optimum efficiency.

During operation, a gas turbine engine as described and/or claimed herein may operate at the cruise conditions defined elsewhere herein. Such cruise conditions may be determined by the cruise conditions (for example the mid-cruise conditions) of an aircraft to which at least one (for example two or four) of the gas turbine engine(s) may be mounted in order to provide propulsive thrust.

What is proposed according to a further aspect is a method for producing a torque-proof connection between the planetary carrier of the previously more closely described planetary gearbox and the support element. Here, the first section of the outer cylindrical shell surface area of the splined sleeve is placed at the bore of the planetary carrier, and the first section of the outer cylindrical shell surface area is inserted into the bore of the planetary carrier until the planetary carrier abuts the conical section of the outer cylindrical shell surface area of the splined sleeve. At that, the splined sleeve comes into overlap with the planetary carrier and the support element. Subsequently, the second section of the outer cylindrical shell surface area is inserted into the planetary carrier until the splined sleeve abuts the end stop of the support element. In the course of this process, the overlapping areas between the splined sleeve and the planetary carrier as well as between the splined sleeve and the support element are enlarged.

Here, the joining force during insertion of the splined sleeve can be kept constant or can be varied. For example, there is the possibility of predefining the joining force to be lower during insertion of the first section than during insertion of the second section.

The planetary carrier can be heated up with respect to an ambient temperature prior to the insertion of the first section of the splined sleeve and/or the splined sleeve can be cooled down with respect to the ambient temperature so that the splined sleeve can be inserted with lower joining forces.

At least during insertion of the second section of the splined sleeve between the planetary carrier and the support element, oil can be introduced under pressure between the outer cylindrical shell surface area of the splined sleeve and the cylindrical surface of the planetary carrier and/or between the inner conical shell surface area of the splined sleeve and the outer conical shell surface area of the support element.

A person skilled in the art will appreciate that, except where mutually exclusive, a feature or parameter described in relation to any one of the above aspects may be applied to any other aspect. Furthermore, except where mutually exclusive, any feature or parameter described herein may be applied to any aspect and/or, except where mutually exclusive, can be combined with any other feature or parameter described herein.

Now, embodiments will be described by way of example with reference to the Figures; in the Figures.

Figure 4:
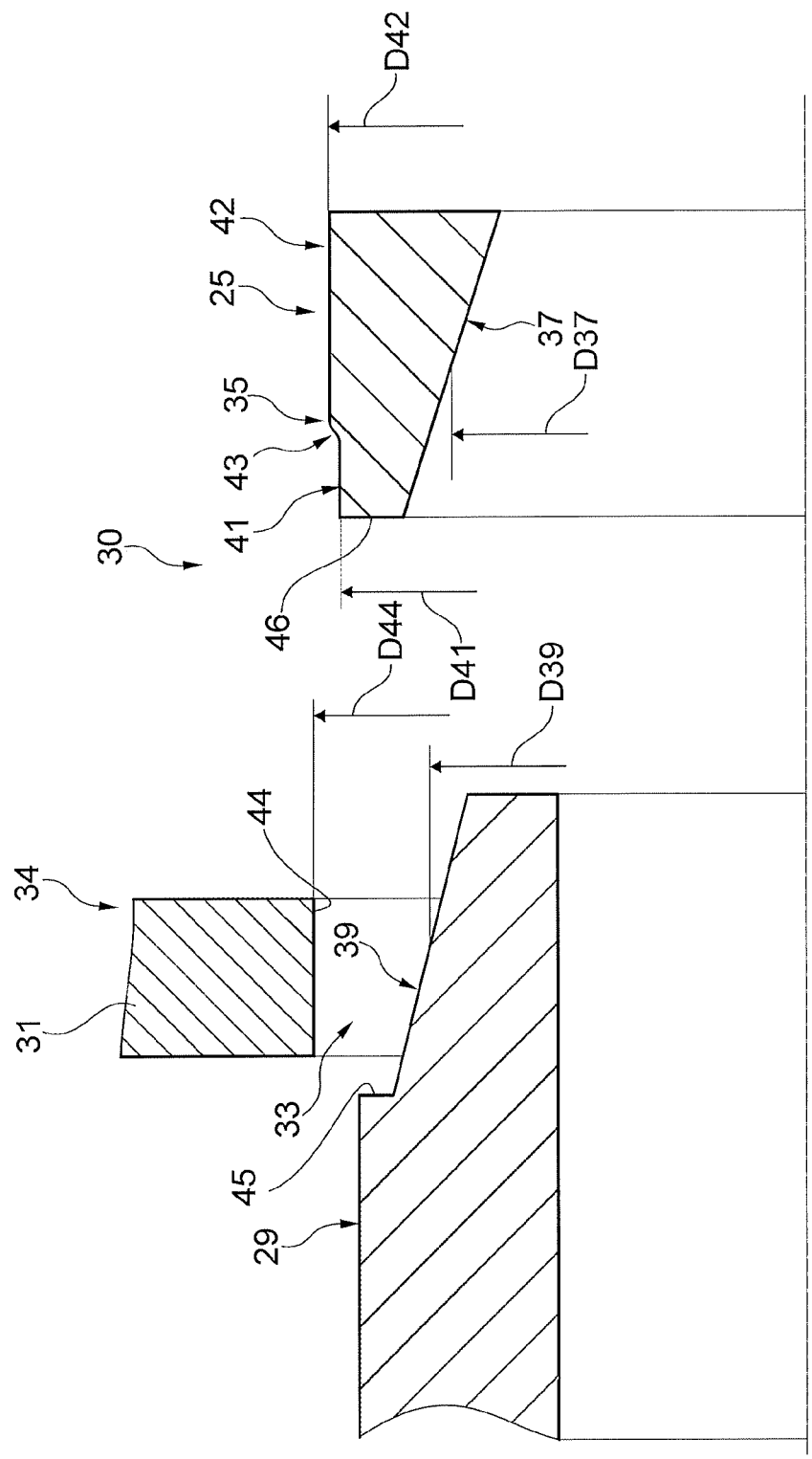
FIG. 4 shows a partial longitudinal section view of a planetary carrier, of a support element, and a splined sleeve of the gearbox according to FIG. 3 in the non-mounted state.
Figure 5:
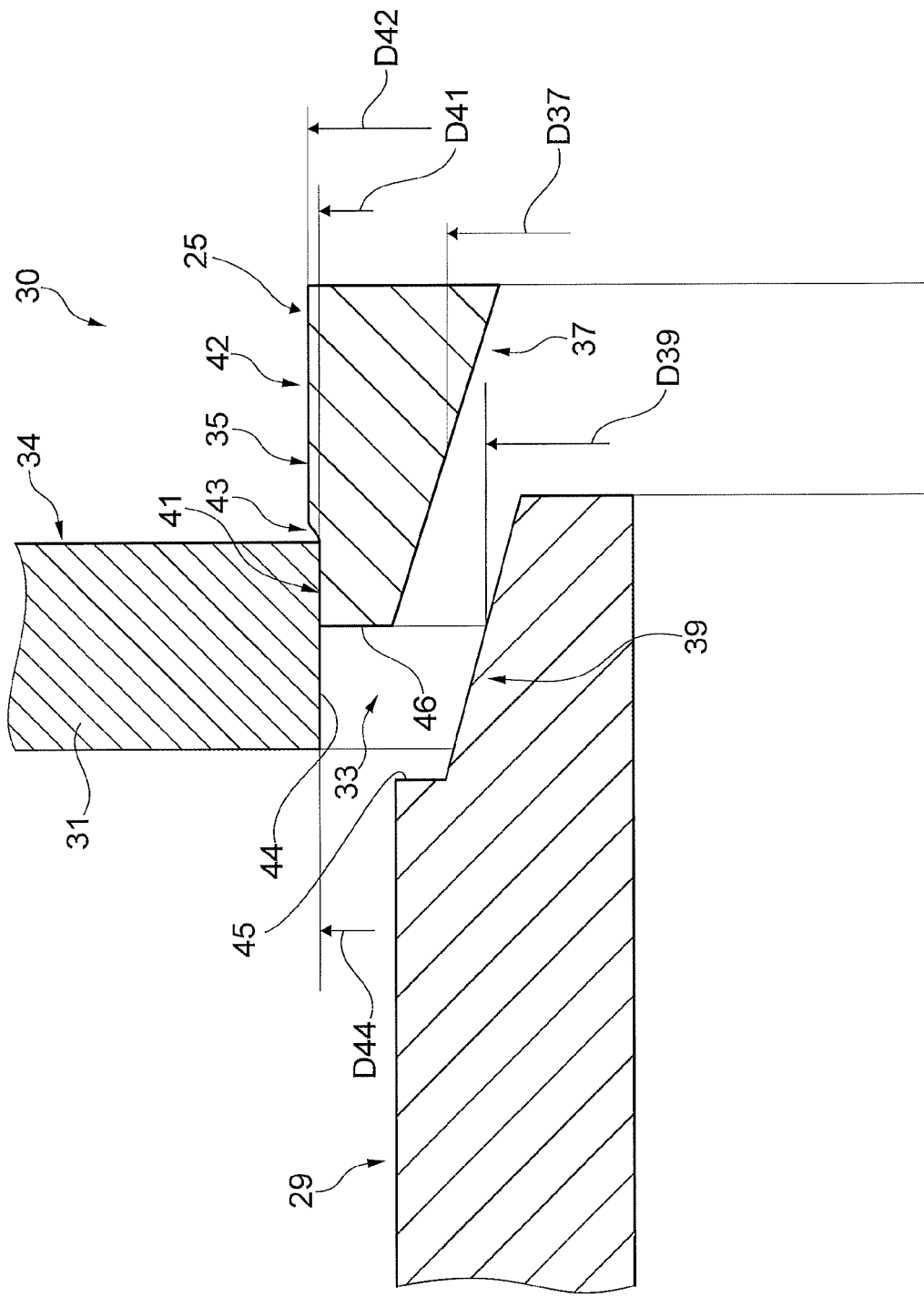
Figure 6:
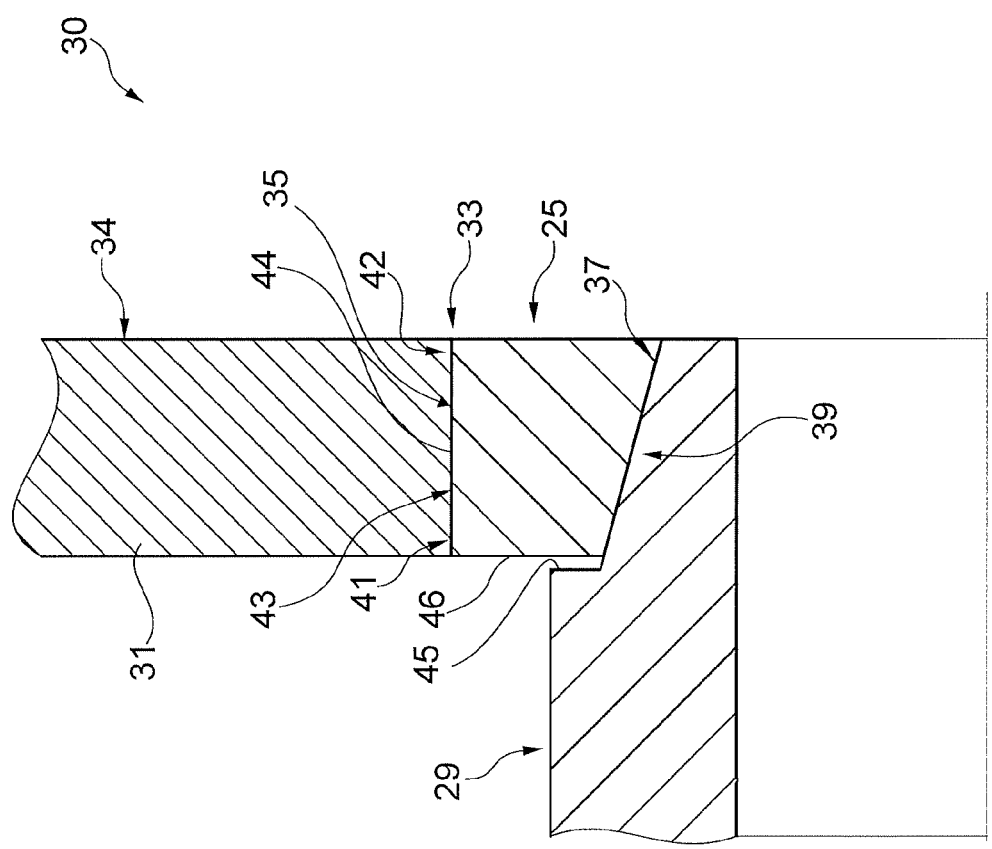

FIG. 5 shows a rendering of the planetary carrier, of the support element, and of the splined sleeve corresponding to FIG. 4, wherein the splined sleeve is inserted with a first outer cylindrical shell surface area into a bore of the planetary carrier; and FIG. 6 shows a rendering of the planetary carrier, of the support element, and of the splined sleeve corresponding to FIG. 4 in the completely mounted state, in which a torque-proof connection between the planetary carrier and the support element is established by means of the splined sleeve.

Figure 1:
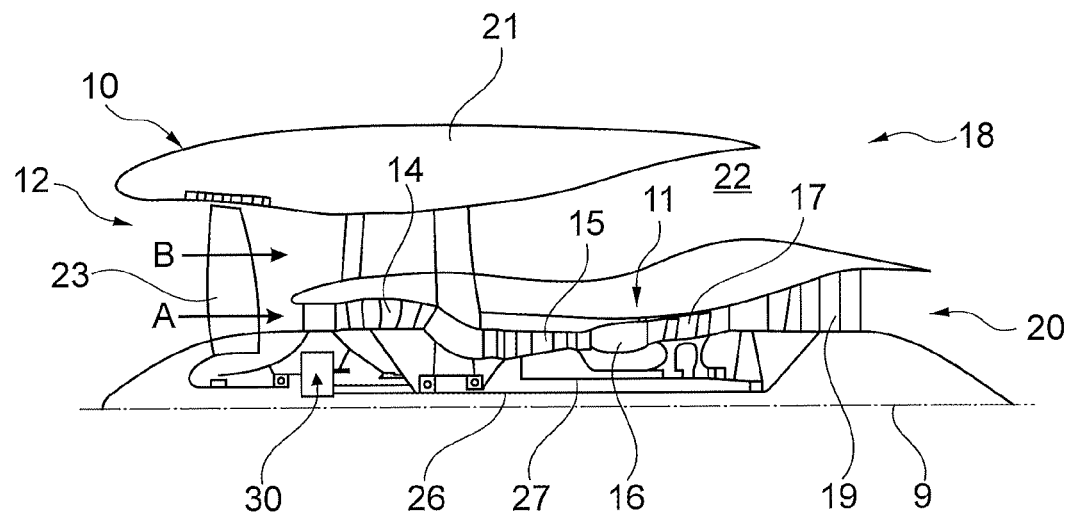
FIG. 1 shows a lateral sectional view of a gas turbine engine.

FIG. 1 describes a gas turbine engine 10 having a main rotational axis 9. The engine 10 comprises an air intake 12 and a thrust fan or fan 23 that generates two airflows: a core airflow A and a bypass airflow B. The gas turbine engine 10 comprises a core 11 that receives the core air flow A. The core engine 11 comprises, as viewed in the axial flow direction, a low-pressure compressor 14, a high-pressure compressor 15, combustion device 16, a high-pressure turbine 17, a low-pressure turbine 19 and a core engine exhaust nozzle 20. An engine nacelle 21 surrounds the gas turbine engine 10 and defines the bypass channel 22 and a bypass exhaust nozzle 18. The bypass airflow B flows through the bypass channel 22. The fan 23 is attached by means of a shaft 26 and an epicycloidal gearbox 30 at the low-pressure turbine 19 and is driven by the same. Here, the shaft 26 is also referred to as the core shaft.

During operation, the airflow A in the core engine 11 is accelerated and compressed by the low-pressure compressor 14, and is directed into the high-pressure compressor 15 where further compression takes place. The air that is discharged from the high-pressure compressor 15 in a compressed state is directed into the combustion device 16 where it is mixed with fuel and combusted. The resulting hot combustion products are then propagated through the high-pressure turbine 17 and the low-pressure turbine 19, and thus drive them before they are discharged through the nozzle 20 for providing a certain thrust. The high-pressure turbine 18 drives the high-pressure compressor 15 by means of a suitable connecting shaft 27. The fan 23 usually provides the greatest portion of the propulsive thrust. Generally, the fan 23 provides the main portion of the thrust. The epicycloidal gearbox 30 is a reduction gear.

Figure 2:
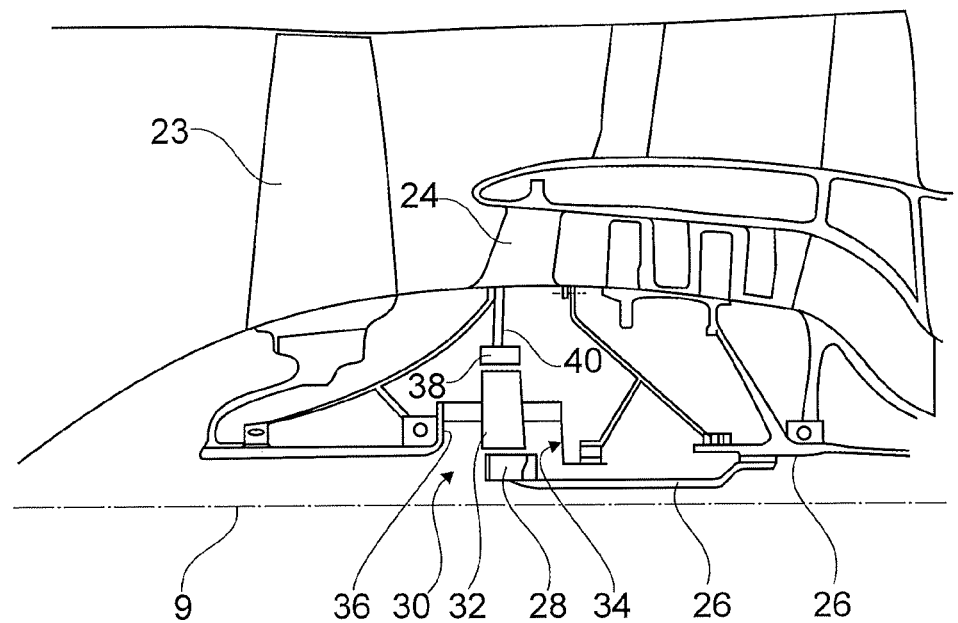
FIG. 2 shows an enlarged partial lateral sectional view of an upstream section of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicycloidal gearbox arrangement 30. Located radially outwardly of the sun gear 28 and intermeshing therewith is a plurality of planetary gears 32 that are coupled with each other by a planet carrier 34. The planetary carrier 34 limits the planetary gears 32 to rotating in synchronicity about the sun gear 28, whilst enabling each planet gear 32 to rotate about its own axis. Via linkages 36, the planetary carrier 34 is coupled to the fan 23 such that it causes its rotation about the engine axis 9. An outer gear or ring gear 38, which is coupled by means of linkages 40 to a stationary support structure 24, is located radially outside with respect to the planetary gears 32 and intermeshes therewith.

It should be noted that the terms "low pressure turbine" and "low pressure compressor" as used herein may be taken to refer to the turbine stage with the lowest pressure and the compressor stage with the lowest pressure (i.e., not including the fan 23) and/or refer to the turbine and compressor stage that are connected by the interconnecting shaft 26 with the lowest rotational speed in the engine 10 (i.e., not including the gearbox output shaft that drives the fan 23). In some documents, "low pressure turbine" and a "low pressure compressor", which are referred to herein, may alternatively also be known as an "intermediate pressure turbine" and an "intermediate pressure compressor". Where such alternative nomenclature is used, the fan 23 may be referred to as a first or lowest pressure stage.

Figure 3:
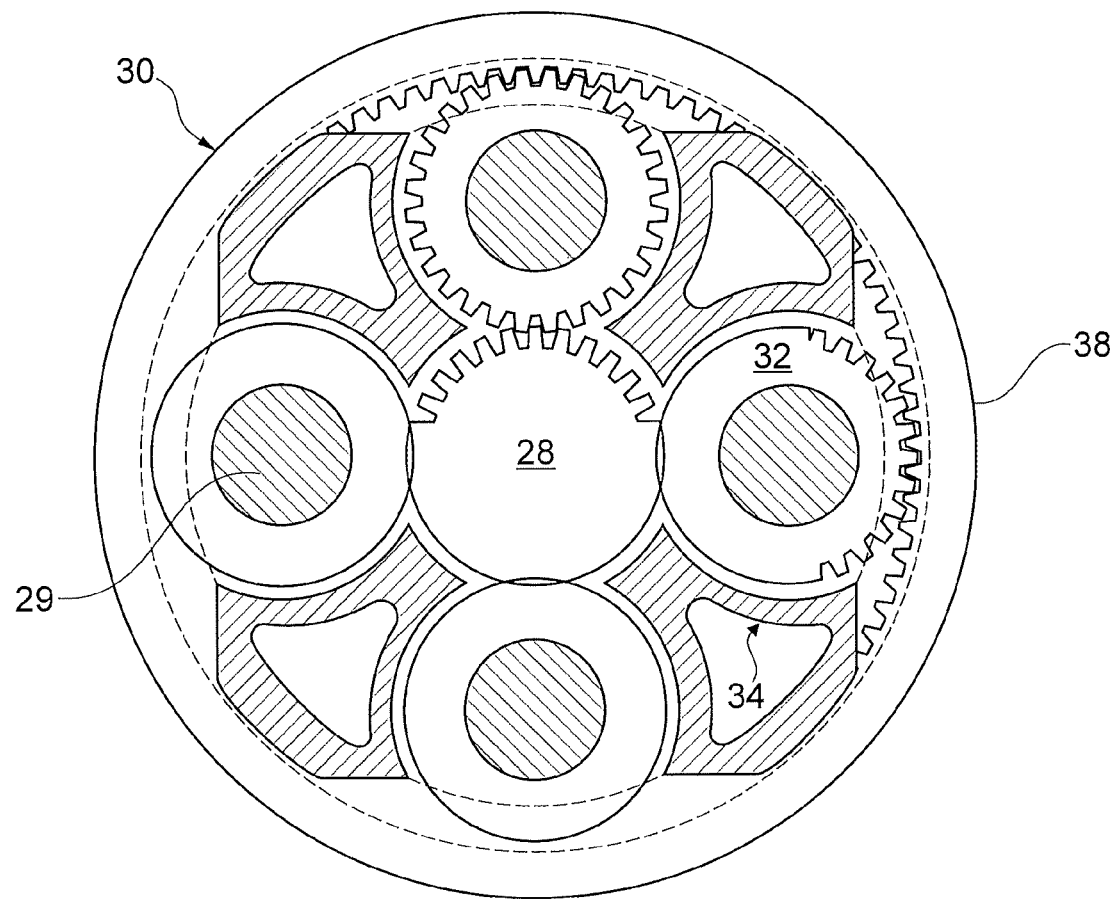
FIG. 3 shows an engine for a gas turbine engine in isolation.

The epicycloidal gearbox 30 is shown in FIG. 3 in more detail by way of example. The sun gear 28, planetary gears 32 and the ring gear 38 respectively have teeth at their circumference to intermesh with the other gears. However, for reasons of clarity only exemplary portions of the teeth are illustrated in FIG. 3. Although four planetary gears 32 are illustrated here, it will be apparent to the person skilled in the art that more or fewer planetary gears 32 may be provided within the scope of the claimed invention. Practical applications of a epicyclic gearbox 30 generally comprise at least three planetary gears 32.

The epicycloidal gearbox 30 shown in FIGS. 2 and 3 by way of example is planetary gearbox, in which the planetary carrier 34 is coupled by means of linkages 36 to the output shaft, wherein the ring gear 38 is fixedly attached. However, it is possible to use any other kind of epicycloidal gearbox 30. As a further example, the epicycloidal gearbox 30 can be a star arrangement in which the planetary carrier 34 is supported in a fixedly attached manner, wherein the ring gear (or outer gear) 38 is allowed to rotate. In such an arrangement, the fan 23 is driven by the ring gear 38. As a further alternative example, the gearbox 30 can be a differential gear which allows for the ring gear 38 as well as planetary carrier 34 to turn.

It is to be understood that the arrangement shown in FIGS. 2 and 3 merely represents an example, and that various alternatives are included in the scope of the present disclosure. Merely as an example, any suitable arrangement for positioning the gearbox 30 in the engine 10 and/or for connecting the gearbox 30 to the engine 10 can be used. As a further example, the connections (e.g. the linkages 36, 40 in the example of FIG. 2) between the gearbox 30 and other parts of the engine 10 (such as e.g. the input shaft 26, the output shaft, and the fixed structure 24) can have a certain degree of stiffness or flexibility. As a further example, any suitable arrangement of the bearings between rotating and stationary parts of the engine (for example between the input and the output shaft of the gearbox and the fixed structures, such as e.g. the gearbox housing) can be used, and the disclosure is not limited to the exemplary arrangement of FIG. 2. For example, it will be obvious for a person skilled in the art that the arrangement of output and support linkages and bearing positions in a star arrangement (described above) of the gearbox 30 would usually differ from those that are shown by way of example in FIG. 2.

Correspondingly, the present disclosure extends to a gas turbine engine with any desired arrangement of gearbox types (for example star arrangements or planetary arrangements), support structures, input and output shaft arrangement, and bearing positions.

Optionally, the gearbox may drive auxiliary and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of connecting shafts. As a further example, the gas turbine engine shown in FIG. 1 has a split flow nozzle 20, 22, which means that the flow through the bypass channel 22 has its own nozzle which is separate from and arranged radially outside of the engine core nozzle 20. However, this is not to be taken in a limiting manner, and any aspect of the present disclosure may also apply to engines in which the flow through the bypass channel 22 and the flow through the core 11 are intermixed or combined in front of (or upstream) a single nozzle, which may be referred to as a mixed flow nozzle. One or both nozzles may have a fixed or variable area (independently of whether a mixed or a partial flow is present). Although the described example refers to a turbofan engine, the disclosure may for example be used in any kind of gas turbine engine, such as e.g. in an open rotor (in which the fan stage is not surrounded by a housing), or a turboprop engine.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the view of FIG. 1). The axial, radial and circumferential directions are mutually perpendicular.

FIG. 4 shows a partial longitudinal section view of the planetary carrier 34, a splined sleeve 25, and a substantially hollow-cylindrical support element 29 on which a planetary gear 32 can be arranged in a rotatable manner and which can be connected by means of the splined sleeve 25 to the planetary carrier 34 in a torque-proof manner in the way described in more detail below. Here, it is provided that each of the planetary gears 32 of the planetary gearbox 30 is arranged in a rotatable manner on a separate support element 29, and that each support element 29 is operatively connected at the end side in a torque-proof manner with plates 31 of the planetary carrier 34 that are arranged at a distance to each other in the axial direction of the planetary gearbox 30 and are fixedly connected to each other by means of respectively one splined sleeve 25. The support elements 29 are formed so as to be tapering off in a conical manner in the area of their both ends and, with these end areas, act together with the plates 31 of the planetary carrier 34 via respectively one splined sleeve 25.

Since the splined sleeves 25 and the areas of the planetary carrier 34 and of the support elements 29 that are respectively acting together with them are embodied in a substantially identical manner, the constructional design of the planetary gearbox 30 and the creation of the torque-proof connection between the support elements 29 and the planetary carrier 34 is explained in more detail based on the renderings according to FIG. 4 to FIG. 6.

In order to provide a torque-proof connection of the support element 29 to the planetary carrier 34, the splined sleeve 25 has to be successively radially inserted into the bore 33 of the plate 31 of the planetary carrier 34 in the manner shown in FIG. 4 to FIG. 6. At the end of the joining processes, the splined sleeve 25 is arranged radially between the plate 31 of the planetary carrier 34 and the support element 29. Then, with a substantially outer cylindrical shell surface area 35, the splined sleeve 25 is in operative connection with a cylindrical surface 44 of the bore 32 of the plate 31 of the planetary carrier 34. With an inner conical shell surface area 37, the splined sleeve 25 is additionally in operative connection with the outer conical shell surface area 39 of the support element 29.

The outer cylindrical shell surface area 35 of the splined sleeve 25 is formed in a stepped manner and comprises respectively a first section 41 and a second section 42 between which a conical section 43 is provided. The outer diameter D41 of the first section 41 is smaller than the outer diameter D42 of the second section 42. Depending on the respectively present application case, the outer diameter D41 of the first section 41 and the inner diameter D44 of the surface 44 of the bore 33 of the planetary carrier 34 are adjusted to each other in such a manner that a clearance fit or a transition fit is present in the overlapping area between the planetary carrier 34 and the first section 41. Moreover, the inner diameter D44 of the surface 44 of the bore 33 of the planetary carrier 34 and the outer diameter D42 of the second section 42 are adjusted to each other in such a manner that an interference fit is present in the overlapping area between the planetary carrier 34 and the second section 42.

The course of the inner diameter D37 of the inner conical shell surface area 37 of the splined sleeve 25 and the course of the outer diameter D39 of the outer conical shell surface area 39 of the support element 29 are additionally adjusted to each other in such a manner that an interference fit is present in the completely fitted operational state of the splined sleeve 25 in the overlapping area between the inner conical shell surface area 37 of the splined sleeve 25 and the outer conical shell surface area 39 of the support element 29.

The axial length of the first section 41 of the outer cylindrical shell surface area 35 of the splined sleeve 25 can correspond to approximately a tenth of the total axial length of the overlapping area between the planetary carrier 34 and the splined sleeve 25, and should be at least 5 mm to be able to arrange the first section 41 of the splined sleeve 25 in the plate 31 of the planetary carrier 34 with sufficient precision in the manner shown in FIG. 5, and to be able to adjust it with respect to the planetary carrier 34 prior to the completely joint state, as shown in FIG. 6.

The outer diameter D41 of the first section 41 of the outer cylindrical shell surface area 35 of the splined sleeve 25 can deviate by a defined diameter value from the inner diameter D44 of the surface 44 of the bore 33 of the planetary carrier 34, wherein the defined diameter value has values of between −0.05 mm and +0.05 mm. The outer diameter D42 of the second section 42 of the outer cylindrical shell surface area 35 of the splined sleeve 25 can deviate by a defined diameter value from the inner diameter D44 of the surface 44 of the bore 33 of the planetary carrier 34, wherein the defined diameter value has values that are higher than zero and lower than or equal to +0.4 mm. The diameter D37 of the inner conical shell surface area 37 of the splined sleeve 25 decreases in the axial direction, starting from the first section 41 of the outer cylindrical shell surface area 35 in the direction of the second section 42 of the outer cylindrical shell surface area 35 in the manner shown in FIG. 4 to FIG. 6.

During the insertion of the first section 41 of the splined sleeve 25 into the planetary carrier 34, the conical section 43 of the outer cylindrical shell surface area 35 forms an end stop for the splined sleeve 25. Here, the axial length and the corresponding taper angle of the conical section 43 are chosen in such a manner that the splined sleeve 25 is inserted into the bore 33 of the planetary carrier 34 only with a first section 41 below a defined joining force that is applied to the splined sleeve 25 and acts in the axial pushing direction. Only if a correspondingly higher joining force is applied, the splined sleeve 25 can be inserted into the bore 33 with the conical section 43 and the second section 42, and the desired torque-proof connection between the support element 29 and the planetary carrier 34 can be established.

In addition, the support element 29 can be formed with an end stop 45 at which the splined sleeve 25 abuts with an end face 46 that is assigned to the first section 41 when, with its second section 42, the splined sleeve 25 is completely in overlap with the planetary carrier 34. In this manner, it is ensured in a simple manner and with low mounting effort that the splined sleeve 25 can be transferred into the position that is necessary for providing the torque-proof connection between the support element 29 and the planetary carrier 34.

To establish a torque-proof connection between the planetary carrier 34 of the planetary gearbox 30 and the support element 29, the first section 41 of the outer cylindrical shell surface area 35 of the splined sleeve 25 is at first placed at the bore 33 of the planetary carrier 34. Subsequently, the first section 41 of the outer cylindrical shell surface area 35 of the splined sleeve 25 is inserted into the bore 33 of the planetary carrier 34 by applying a corresponding axial joining force to the splined sleeve 25 until the planetary carrier 34 abuts the conical section 43 of the outer cylindrical shell surface area 35 of the splined sleeve 25. Here, the splined sleeve 25 increasingly comes into overlap with the planetary carrier 34 and with the support element 29.

After that, the splined sleeve 25 is inserted further into the area between the planetary carrier 34 and the support element 29 by increasing the axial joining force, until the second section 42 of the outer cylindrical shell surface area 35 of the splined sleeve 25 is inserted into the planetary carrier 34, and the splined sleeve 25 abuts with an end face 46 at the end stop 45 of the support element 29. The overlapping areas between of the splined sleeve 25 and the planetary carrier 34 as well as between the splined sleeve 25 and the support element 29 are increased in the course of this process.

Depending on the respectively present application case, there is the option of heating up the planetary carrier 34 with respect to an ambient temperature prior to the insertion of the first section 41 of the splined sleeve 25 and/or to cool down the splined sleeve 25 with respect to the ambient temperature. Further, it can also be provided that, at least during insertion of the second section 42 of the splined sleeve 25 between the planetary carrier 34 and the support element 29, oil is introduced under pressure between the outer cylindrical shell surface area 35 of the splined sleeve 25 and the cylindrical surface 44 of the planetary carrier 34 and/or between the inner conical shell surface area 37 of the splined sleeve 25 and the outer conical shell surface area 39 of the support element 29.

It is to be understood that the invention is not limited to the above-described embodiments, and that various modifications and improvements can be carried out without departing from the described concepts. Any of the features can be used either separately or in combination with any of the other features, so long as they are not mutually exclusive, and the disclosure extends to all combinations and subcombinations of one or multiple features described herein, and includes the same

PARTS LIST 9 main rotational axis
10 gas turbine engine
11 core
12 air intake
14 low-pressure compressor
15 high-pressure compressor
16 combustion device
17 high-pressure turbine
18 bypass thrust nozzle
19 low-pressure turbine
20 core thrust nozzle
21 engine nacelle
22 bypass channel
23 thrust fan
24 support structure
25 splined sleeve
26 shaft, connecting shaft
27 connecting shaft
28 sun gear
29 support element
30 gearbox, planetary gearbox
31 plate of the planetary carrier
32 planetary gear
33 bore of the planetary carrier
34 planetary carrier
35 outer cylindrical shell surface area of the splined sleeve
36 linkage
37 inner conical shell surface area of the splined sleeve
38 ring gear
39 outer conical shell surface area of the support element
40 linkage
41 first section of the outer cylindrical shell surface area of the splined sleeve
42 second section of the outer cylindrical shell surface area of the splined sleeve
43 conical section of the outer cylindrical shell surface area of the splined sleeve
44 cylindrical surface of the bore of the planetary carrier
45 end stop of the support element
46 end face of the splined sleeve
A core airflow
B bypass airflow
D37 inner diameter of the inner conical shell surface area of the splined sleeve
D39 outer diameter of the outer conical shell surface area of the support element
D41 outer diameter of the first section of the outer cylindrical shell surface area of the splined sleeve
D42 outer diameter of the second section of the outer cylindrical shell surface area of the splined sleeve D44 inner diameter of the surface of the bore of the planetary carrier

The invention claimed is:

1. A planetary gearbox, comprising:
a planetary carrier having a bore with a cylindrical surface,
a support element fixedly connected to the planetary carrier and including an outer conical shell surface area,
the support element radially engaging in the bore of the planetary carrier,
a splined sleeve provided radially between the planetary carrier and the support element,
the splined sleeve including an outer cylindrical shell surface area in operative connection with the cylindrical surface of the bore of the planetary carrier,
the splined sleeve including an inner conical shell surface area, in operative connection with the outer conical shell surface area of the support element,
the outer cylindrical shell surface area of the splined sleeve having a stepped shape and including a first section a second section and a conical section positioned between the first section and the second section,
an outer diameter of the first section being smaller than an outer diameter of the second section,
the outer diameter of the first section and an inner diameter of the cylindrical surface of the bore of the planetary carrier being configured such that a clearance fit or a transition fit is present in an overlapping area between the planetary carrier and the first section,
the inner diameter of the cylindrical surface of the bore of the planetary carrier and the outer diameter of the second section being configured such that an interference fit is present in an overlapping area between the planetary carrier and the second section.

2. The planetary gearbox according to claim 1, wherein:
a course of an inner diameter of the inner conical shell surface area of the splined sleeve and a course of a diameter of the outer conical shell surface area of the support element being configured such that, in a completely fitted operational state of the splined sleeve, an interference fit is present in an overlapping area between the inner conical shell surface area of the splined sleeve and the outer conical shell surface area of the support element.

3. The planetary gearbox according to claim 1, wherein an axial length of the first section of the outer cylindrical shell surface area of the splined sleeve corresponds to a tenth of a total axial length of a total overlapping area between the planetary carrier and the splined sleeve.

4. The planetary gearbox according to claim 3, wherein the axial length of the first section of the outer cylindrical shell surface area of the splined sleeve is at least 5 mm.

5. The planetary gearbox according to claim 1, wherein the outer diameter of the first section of the outer cylindrical shell surface area of the splined sleeve deviates by a defined diameter value from the inner diameter of the cylindrical surface of the bore of the planetary carrier, wherein the defined diameter value has values of between −0.05 mm and +0.05 mm.

6. The planetary gearbox according to claim 1, wherein the outer diameter of the second section of the outer cylindrical shell surface area of the splined sleeve deviates by a defined diameter value from the inner diameter of the cylindrical surface of the bore of the planetary carrier, wherein the defined diameter value has values that are higher than zero and lower than or equal to +0.4 mm.

7. The planetary gearbox according to claim 1, wherein a diameter of the inner conical shell surface area decreases in an axial direction, starting from the first section of the outer cylindrical shell surface area in a direction of the second section of the outer cylindrical shell surface area of the splined sleeve.

8. The planetary gearbox according to claim 1, wherein the conical section of the outer cylindrical shell surface area of the splined sleeve forms an end stop with respect to the first section of the splined sleeve into the planetary carrier.

9. The planetary gearbox according to claim 1, wherein the splined sleeve includes an end face at the first section and the support element includes an end stop at which the end face abuts when, with the second section, the splined sleeve is completely in overlap with the planetary carrier.

10. A gas turbine engine for an aircraft, comprising:
an engine core comprising a turbine, a compressor, and a core shaft connecting the turbine to the compressor;
a fan positioned upstream of the engine core, the fan including multiple blades; and
a gearbox that receives an input from the core shaft and outputs a drive for the fan for driving the fan with a lower rotational speed than the core shaft,
wherein the gearbox is the planetary gearbox according to claim 1.

11. A splined sleeve comprising:
an outer cylindrical shell surface area,
an inner conical shell surface area,
the diameter of the inner conical shell surface area decreasing in an axial direction starting from a first end of the splined sleeve in a direction of a second end of the splined sleeve,
the outer cylindrical shell surface area shaped in a stepped manner,
the outer cylindrical shell surface area comprising:
a first cylindrical section,
a second cylindrical section which has a diameter that is larger than a diameter of the first cylindrical section, and
a conical area positioned between the first and second cylindrical sections.

12. The gas turbine engine according to claim 10, wherein:
the turbine is a first turbine, the compressor is a first compressor, and the core shaft is a first core shaft;
the engine core further comprises a second turbine, a second compressor, and a second core shaft that connects the second turbine to the second compressor; and
the second turbine, the second compressor, and the second core shaft are arranged such that they rotate with a higher rotational speed than the first core shaft.

13. A method for producing a torque-proof connection between a planetary carrier and a support element of a planetary gearbox, comprising:
providing:
a planetary gearbox, comprising:
a planetary carrier having a bore with a cylindrical surface,
a support element fixedly connected to the planetary carrier and including an outer conical shell surface area,
the support element radially engaging in the bore of the planetary carrier,
a splined sleeve provided radially between the planetary carrier and the support element, the splined sleeve including an outer cylindrical shell surface area in operative connection with the cylindrical surface of the bore of the planetary carrier, the splined sleeve including an inner conical shell surface area, in operative connection with the outer conical shell surface area of the support element, the outer cylindrical shell surface area of the splined sleeve having a stepped shape and including a first section a second section and a conical section positioned between the first section and the second section, an outer diameter of the first section being smaller than an outer diameter of the second section, the outer diameter of the first section and an inner diameter of the cylindrical surface of the bore of the planetary carrier being configured such that a clearance fit or a transition fit is present in an overlapping area between the planetary carrier and the first section, the inner diameter of the cylindrical surface of the bore of the planetary carrier and the outer diameter of the second section being configured such that an interference fit is present in an overlapping area between the planetary carrier and the second section, placing the first section of the outer cylindrical shell surface area of the splined sleeve at the bore of the planetary carrier, inserting the first section of the outer cylindrical shell surface area into the bore of the planetary carrier until the planetary carrier abuts at the conical section of the outer cylindrical shell surface area of the splined sleeve to move the splined sleeve into overlap with the planetary carrier and the support element, further inserting the second section of the outer cylindrical shell surface area into the planetary carrier until the splined sleeve abuts at an end stop of the support element, wherein the overlapping areas between the splined sleeve and the planetary carrier as well as between the splined sleeve and the support element are enlarged during the further inserting.

14. The method according to claim 13, wherein, prior to the insertion of the first section of the splined sleeve, performing at least one chosen from heating the planetary carrier with respect to an ambient temperature and cooling the splined sleeve with respect to the ambient temperature.

15. The method according to claim 13, wherein, at least during further inserting of the second section of the splined sleeve between the planetary carrier and the support element, introducing oil under pressure between at least one chosen from the outer cylindrical shell surface area of the splined sleeve and the cylindrical surface of the bore of the planetary carrier, and, the inner conical shell surface area of the splined sleeve and the outer conical shell surface area of the support element.

* * * * *